(12) United States Patent
Guliani et al.

(10) Patent No.: US 12,367,865 B2
(45) Date of Patent: Jul. 22, 2025

(54) EXPLORING HETEROGENEOUS CHARACTERISTICS OF LAYERS IN ASR MODELS FOR MORE EFFICIENT TRAINING

(71) Applicant: Google LLC

(72) Inventors: Dhruv Guliani, Mountain View, CA (US); Lillian Zhou, Mountain View, CA (US); Andreas Kabel, Mountain View, CA (US); Giovanni Motta, Mountain View, CA (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 17/938,015

(22) Filed: Oct. 4, 2022

(65) Prior Publication Data

US 2023/0107475 A1      Apr. 6, 2023

Related U.S. Application Data

(60) Provisional application No. 63/262,188, filed on Oct. 6, 2021.

(51) Int. Cl.
  *G10L 15/06*    (2013.01)
  *G10L 15/01*    (2013.01)
  *G10L 15/16*    (2006.01)

(52) U.S. Cl.
  CPC .......... *G10L 15/063* (2013.01); *G10L 15/01* (2013.01); *G10L 15/16* (2013.01)

(58) Field of Classification Search
  CPC ....... G10L 15/063; G10L 15/01; G10L 15/16; G06N 3/0499; G06N 3/0442;
  (Continued)

(56) References Cited

U.S. PATENT DOCUMENTS

2019/0005945 A1*  1/2019  Hofer ............... G10L 15/26
2019/0197407 A1*  6/2019  Yao ................. G06N 3/04
(Continued)

OTHER PUBLICATIONS

Chiyuan Zhang et al, "Are All Layers Created Equal?", Arxiv.Org, Cornell University Library, 201 Olin Library Cornell University Ithaca, NY 14853, Feb. 6, 2019 (Feb. 6, 2019) (Year: 2019).*

(Continued)

*Primary Examiner* — Andrew C Flanders
*Assistant Examiner* — Cameron Kenneth Young
(74) *Attorney, Agent, or Firm* — Honigman LLP; Brett A. Krueger; Grant Griffith

(57) ABSTRACT

A computer-implemented method includes obtaining a multi-domain (MD) dataset and training a neural network model using the MD dataset with short-form data withheld (MD-SF). The neural network model includes a plurality of layer each having a plurality of parameters. The method also includes resetting each respective layer in the trained neural network one at a time. For each respective layer in the trained neural network model, and after resetting the respective layer, the method also includes determining a corresponding word error rate of the trained neural network model and identifying the respective layer as corresponding to an ambient layer when the corresponding word error rate satisfies a word error rate threshold. The method also includes transmitting an on-device neural network model to execute on one or more client devices for generating gradients based on the withheld domain (SF) of the MD dataset.

20 Claims, 7 Drawing Sheets

(58) Field of Classification Search
CPC .... G06N 3/0455; G06N 3/0464; G06N 3/082; G06N 3/09; G06N 3/096; G06N 3/098
See application file for complete search history.

(56) References Cited

U.S. PATENT DOCUMENTS

| | | | | |
|---|---|---|---|---|
| 2019/0332940 | A1* | 10/2019 | Han | G06N 3/045 |
| 2020/0234086 | A1* | 7/2020 | Taha | G06F 18/2148 |
| 2020/0234110 | A1* | 7/2020 | Singh | G06N 3/04 |
| 2022/0139384 | A1* | 5/2022 | Wu | G06F 40/35 704/257 |
| 2022/0310068 | A1* | 9/2022 | Ren | G10L 15/16 |

OTHER PUBLICATIONS

Sin Kit Lo et al., "A systematic literature review on federated machine learning: from a software engineering perspective", arXiv.org, Cornell University Library, 201 Olin Library Cornell University Ithaca, NY 14853,Dec. 4, 2020 (May 14, 2021) (Year: 2020).*
Dhruv Guliani et al, "Training Speech Recognition Models with Federating Learning: A Quality/Cost Framework", arxiv.org, Cornell University Library, 201 Olin Library Cornell University Ithaca, NY 14853,May 14, 2021 (May 14, 2021.) (Year: 2021).*
Adalglou Nikolas, "In-layer Normalization Techniques for Training Very Deep Neural Networks", Sep. 21, 2021 (Year: 2021).*
Chiyuan Zhang et al., "Are All Layers Created Equal?", arxiv.org, Cornell University Library, 201 Olin Library Cornell University Ithaca, NY 14853,Feb. 6, 2019 (Feb. 6, 2019).
Sin Kit Lo et al., "A Systematic Literature Review on Federated Machine Learning: From A Software Engineering Perspective", arxiv.org, Cornell University Library, 201 Olin Library Cornell University Ithaca, NY 14853,Dec. 4, 2020 (Dec. 4, 2020).
Dhruv Guliani et al., "Training Speech Recognition Models with Federated Learning: A Quality/Cost Framework", arxiv.org, Cornell University Library, 201 Olin Library Cornell University Ithaca, NY 14853,May 14, 2021 (May 14, 2021).
Adaloglou Nikolas, "In-layer normalization techniques for training very deep neural networks", Sep. 21, 2021 (Sep. 21, 2021), Retrieved from the Internet: URL:https://theaisummer.com/normalization/.
International Search Report and Written Opinion issued in related PCT Application No. PCT/US2022/077556, dated Jan. 18, 2023.

* cited by examiner

EXPLORING HETEROGENEOUS CHARACTERISTICS OF LAYERS IN ASR MODELS FOR MORE EFFICIENT TRAINING

CROSS REFERENCE TO RELATED APPLICATIONS

This U.S. Patent Application claims priority under 35 U.S.C. § 119(e) to U.S. Provisional Application 63/262,188, filed on Oct. 6, 2021. The disclosure of this prior application is considered part of the disclosure of this application and is hereby incorporated by reference in its entirety.

TECHNICAL FIELD

This disclosure relates to exploring heterogeneous characteristics of layers in ASR models for more efficient training.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. However, one challenge in developing deep learning-based ASR models is that deep neural networks benefit from being over-parameterized such that the ASR models include well over 100 million parameters and require hundreds of thousands of training steps to converge. As a result, training these over-parameterized ASR models is a resource intensive process that may not be suitable for devices with limited computing resources and memory.

SUMMARY

One aspect of the disclosure provides a computer-implemented method that when executed on data processing hardware causes the data processing hardware to perform operations for exploring heterogeneous characteristics of layers in ASR models for more efficient training. The operations include obtaining a multi-domain (MD) dataset. The operations also include training a neural network model using the MD dataset with short-form data withheld (MD-SF). Here, the neural network model includes a plurality of layers each having a plurality of parameters. The operations also include resetting each respective layer in the trained neural network model one at a time. For each respective layer in the trained neural network model, and after resetting the respective layer, the operations also include: determining a corresponding word error rate of the trained neural network model associated with the respective layer that has been reset and identifying the respective layer as corresponding to an ambient layer when the corresponding word error rate of the trained neural network model associated with the respective layer that has been reset satisfies a word error rate threshold. The operations also include transmitting an on-device neural network model to execute on one or more client devices for generating gradients based on the withheld domain (SF) of the MD dataset. Here, the on-device neural network model includes the plurality of layers of the trained neural network model and generated by applying Federated Dropout more heavily on any layers of the plurality of layers of the trained neural network model identified as corresponding to the ambient layer to reduce the number of parameters of the on-device neural network model.

Implementations of the disclosure may include one or more of the following optional features. In some implementations, resetting each respective layer in the trained neural network model one at a time includes re-initializing the plurality of parameters of the respective layer of the neural network model to initial values of the respective layer. In other implementations, resetting each respective layer in the trained neural network model one at a time include re-randomizing the plurality of parameters of the respective layer of the neural network model by setting the plurality of parameters of the respective layer to random values sampled from a sample distribution that the original initial values were sampled from. Resetting each respective layer in the trained neural network model one at a time may include resetting each respective layer in the trained neural network model one at a time without resetting any of the other layers in the trained neural network model.

In some examples, the plurality of layers of the neural network model includes multi-head self-attention layers. In these examples, the multi-head self-attention layers may include conformer layers. The multi-head self-attention layers may include transformer layers. In some implementations, the neural network model includes a speech recognition model. For each respective layer in the trained neural network model, and after resetting the respective layer, the operations may further include identifying the respective layer as corresponding to a critical layer when the corresponding word error rate of the trained neural network model associated with the respective layer that has been reset fails to satisfy the word error rate threshold. In some implementations, training the neural network model includes training the neural network model using group normalization.

Another aspect of the disclosure provides a system that includes data processing hardware and memory hardware storing instructions that when executed on the data processing hardware causes the data processing hardware to perform operations. The operations include obtaining a multi-domain (MD) dataset. The operations also include training a neural network model using the MD dataset with short-form data withheld (MD-SF). Here, the neural network model includes a plurality of layers each having a plurality of parameters. The operations also include resetting each respective layer in the trained neural network model one at a time. For each respective layer in the trained neural network model, and after resetting the respective layer, the operations also include: determining a corresponding word error rate of the trained neural network model associated with the respective layer that has been reset and identifying the respective layer as corresponding to an ambient layer when the corresponding word error rate of the trained neural network model associated with the respective layer that has been reset satisfies a word error rate threshold. The operations also include transmitting an on-device neural network model to execute on one or more client devices for generating gradients based on the withheld domain (SF) of the MD dataset. Here, the on-device neural network model includes the plurality of layers of the trained neural network model and generated by applying Federated Dropout more heavily on any layers of the plurality of layers of the trained neural network model identified as corresponding to the ambient layer to reduce the number of parameters of the on-device neural network model.

Implementations of the disclosure may include one or more of the following optional features. In some implementations, resetting each respective layer in the trained neural network model one at a time includes re-initializing the plurality of parameters of the respective layer of the neural network model to initial values of the respective layer. In other implementations, resetting each respective layer in the trained neural network model one at a time include re-randomizing the plurality of parameters of the respective layer of the neural network model by setting the plurality of parameters of the respective layer to random values sampled from a sample distribution that the original initial values were sampled from. Resetting each respective layer in the trained neural network model one at a time may include resetting each respective layer in the trained neural network model one at a time without resetting any of the other layers in the trained neural network model.

In some examples, the plurality of layers of the neural network model includes multi-head self-attention layers. In these examples, the multi-head self-attention layers may include conformer layers. The multi-head self-attention layers may include transformer layers. In some implementations, the neural network model includes a speech recognition model. For each respective layer in the trained neural network model, and after resetting the respective layer, the operations may further include identifying the respective layer as corresponding to a critical layer when the corresponding word error rate of the trained neural network model associated with the respective layer that has been reset fails to satisfy the word error rate threshold. In some implementations, training the neural network model includes training the neural network model using group normalization.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

End-to-End (E2E) automatic speech recognition (ASR) models have made significant performance improvements over conventional models. However, these ASR models may include well over 100 million parameters and require hundreds of thousands of training steps to converge. Results have shown the ASR models greatly benefit from the over-parameterization, however, this training process is resource intensive such that the hundreds of thousands of training steps may not be suitable for training ASR models on edge devices. In particular, edge devices (e.g., client devices) do not have the same computing resources and memory resources as remote computing devices (e.g., cloud computing environments) have to train ASR models. Accordingly, training ASR models on edge devices with fewer training steps and fewer parameters while maintaining overall performance of the ASR model would provide a significant benefit.

Implementations herein are directed toward methods and systems for exploring heterogeneous characteristics of layers in ASR models for more efficient training. In particular, a layer identification (ID) process trains a neural network model (e.g., ASR model) using a multi-domain (MD) dataset. Here, the ASR model includes a plurality of layers each having a plurality of parameters. After training the ASR model, the layer ID process resets each respective layer of the trained ASR model one at a time and determines a corresponding word error rate (WER) of the trained ASR model associated with the respective layer that has been reset. As will become apparent, when determining the corresponding WER only a single respective layer is reset while all other layers remain are not reset. Based on the corresponding WER, the layer ID process identifies the respective layer as corresponding to an ambient layer or a critical layer. Thereafter, the method includes transmitting the ASR model to execute on one or more client devices by applying Federated Dropout more heavily on layers identified as corresponding to the ambient layer to reduce the number of parameters of the on-device ASR model. Notably, by applying Federated Dropout more heavily on the ambient layers, training on-device ASR models on the one or more client devices is more efficient while only resulting in negligible (if any) performance degradations of the ASR model. Moreover, the client devices may generate gradients (e.g., losses) from training the on-device ASR models locally and transmit the gradients to a remote computing device to further improve the ASR model training on the remote computing device.

Figure 1:
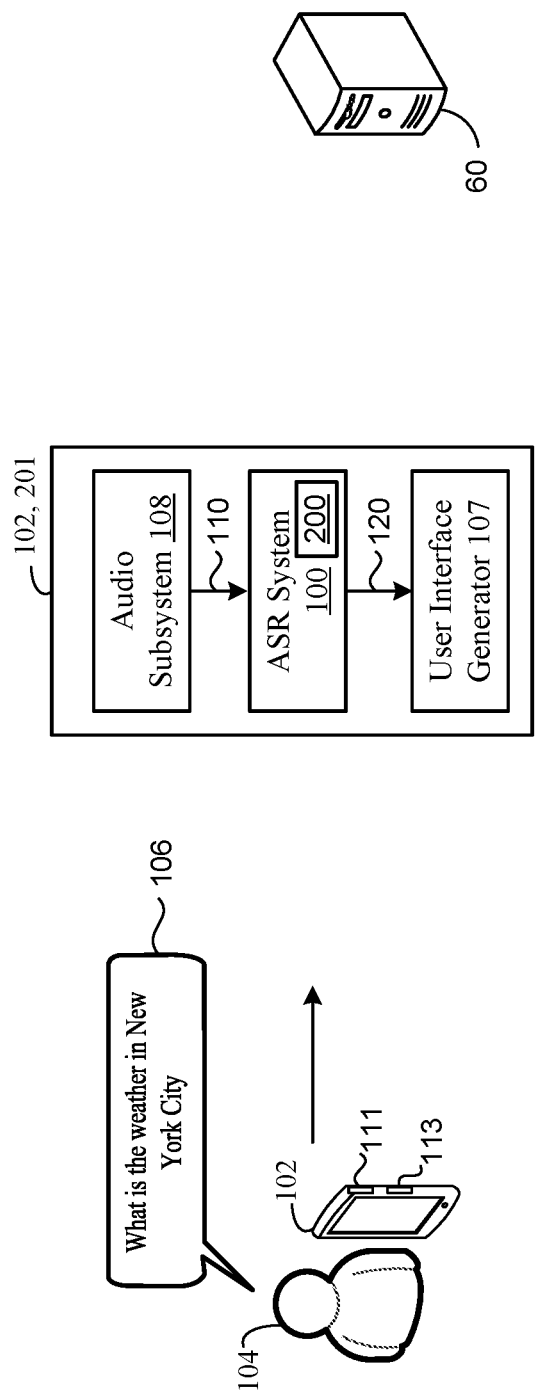
FIG. 1 is a schematic view of an example speech recognition system including a speech recognition model.

FIG. 1 illustrates an automated speech recognition system (ASR) system 100 implementing a neural network model (e.g., ASR model) 200 that resides on a client device 102 of a client 104 and/or on a remote computing device 60 (e.g., one or more servers of a distributed system executing in a cloud-computing environment) in communication with the client device 102. Although the client device 102 is depicted as a mobile computing device (e.g., a smart phone), the client device 102 may correspond to any type of computing device such as, without limitation, a tablet device a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The client device 102 includes an audio subsystem 108 configured to receive an utterance 106 spoken by the client 104 (e.g., the client device 102 may include one or more microphones for recording the spoken utterance 106) and convert the utterance 106 into a corresponding digital format associated with input acoustic frames 110 capable of being processed by the ASR system 100. In the example shown, the client speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the client device 102 and/or the remote computing device 60 also executes a user interface generator 107 configured to present a representation of the transcription 120 of the utterance 106 to the client 104 of the client device 102. In some configurations, the transcription 120 output from the ASR system 100 is processed, e.g., by a natural language understanding (NLU) module executing on the client device 102 or the remote computing device 60, to execute a client command. Additionally or alternatively, a text-to-speech model (e.g., executing on any combination of the client device 102 or the remote computing device 60) may convert the transcription into synthesized speech for audible output by another device. For instance, the original utterance 106 may correspond to a message the client 104 is sending to a friend in which the transcription 120 is converted to synthesized speech for audible output to the friend to listen to the message conveyed in the original utterance 106.

Figure 2:
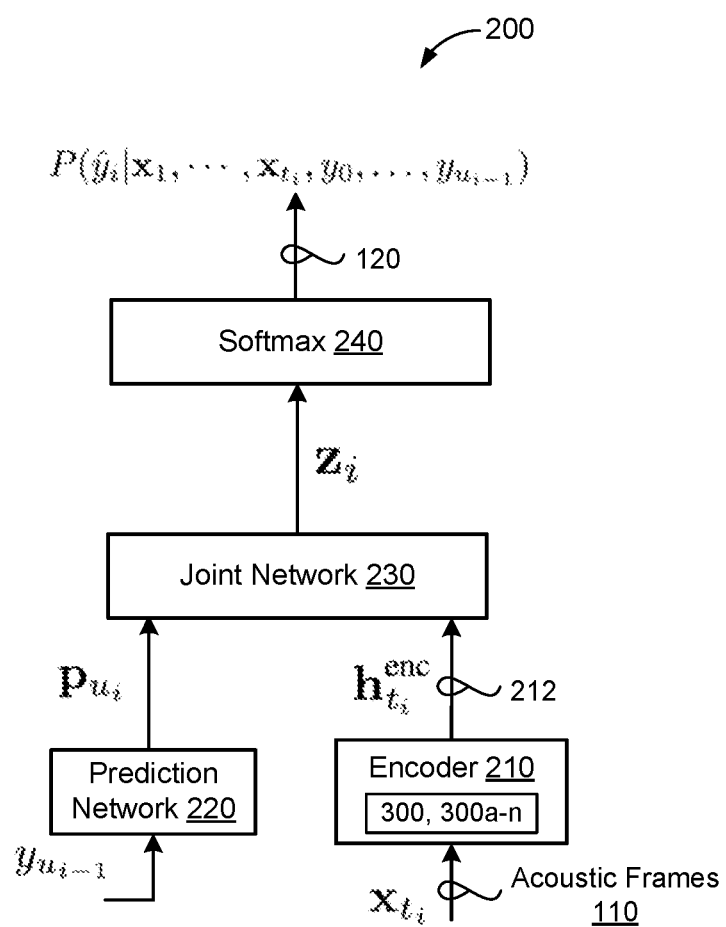
FIG. 2 is a schematic view of an example speech recognition model including a Recurrent Neural Network-Transducer (RNN-T) model architecture.

Referring to FIG. 2, an example ASR model 200 may include a Recurrent Neural Network-Transducer (RNN-T) model architecture which adheres to latency constraints associated with interactive applications. The use of the RNN-T model architecture model architecture is exemplary, and the ASR model 200 may include other architectures such as transformer-transducer and conformer-transducer model architectures among others. The RNN-T model 200 provides a small computation footprint and utilizes less memory requirements than conventional ASR architectures, making the RNN-T model architecture suitable for performing speech recognition entirely on the client device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance, the encoder network (e.g., encoder) 210 reads a sequence of d-dimensional feature vectors (e.g., acoustic frames 110 (FIG. 1)) $x=(x_1, x_2, \ldots, x_T)$, where $x_t \in \mathbb{R}^d$, and produces, at each output step, a higher-order feature representation 212. This higher-order feature representation 212 may also be denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not may any conditional independence assumption, rather the prediction of each symbol is conditioned not only on the acoustic but also on the sequence of labels output so far. As such, the Softmax layer 240 may select the speech recognition hypotheses having a highest corresponding probability from the probability distribution as the transcription 120. The RNN-T model 200 does assume an output symbol is independent of future acoustic frames 110, which allows the RNN-T model to be employed in a streaming fashion.

In some examples, the encoder 210 of the RNN-T model 200 includes a plurality of multi-head (e.g., 8 heads) self-attention layers 300, 300a-n. For example, the plurality of multi-head self-attention layers 300 may include conformer layers (e.g., conformer-encoder), transformer layers, performer layers, convolution layers (including lightweight convolution layers), or any other type of multi-head self-attention layers. The plurality of multi-head self-attention layers 300 may include any number of layers, for instance 16 layers. Moreover, the encoder 210 may operate in a streaming fashion (e.g., encoder 210 outputs the higher-order feature representations 212 as soon as they are generated) or in a non-streaming fashion whereby the encoder 210 processes additional right-context to improve upon the speech recognition results.

Figure 3:
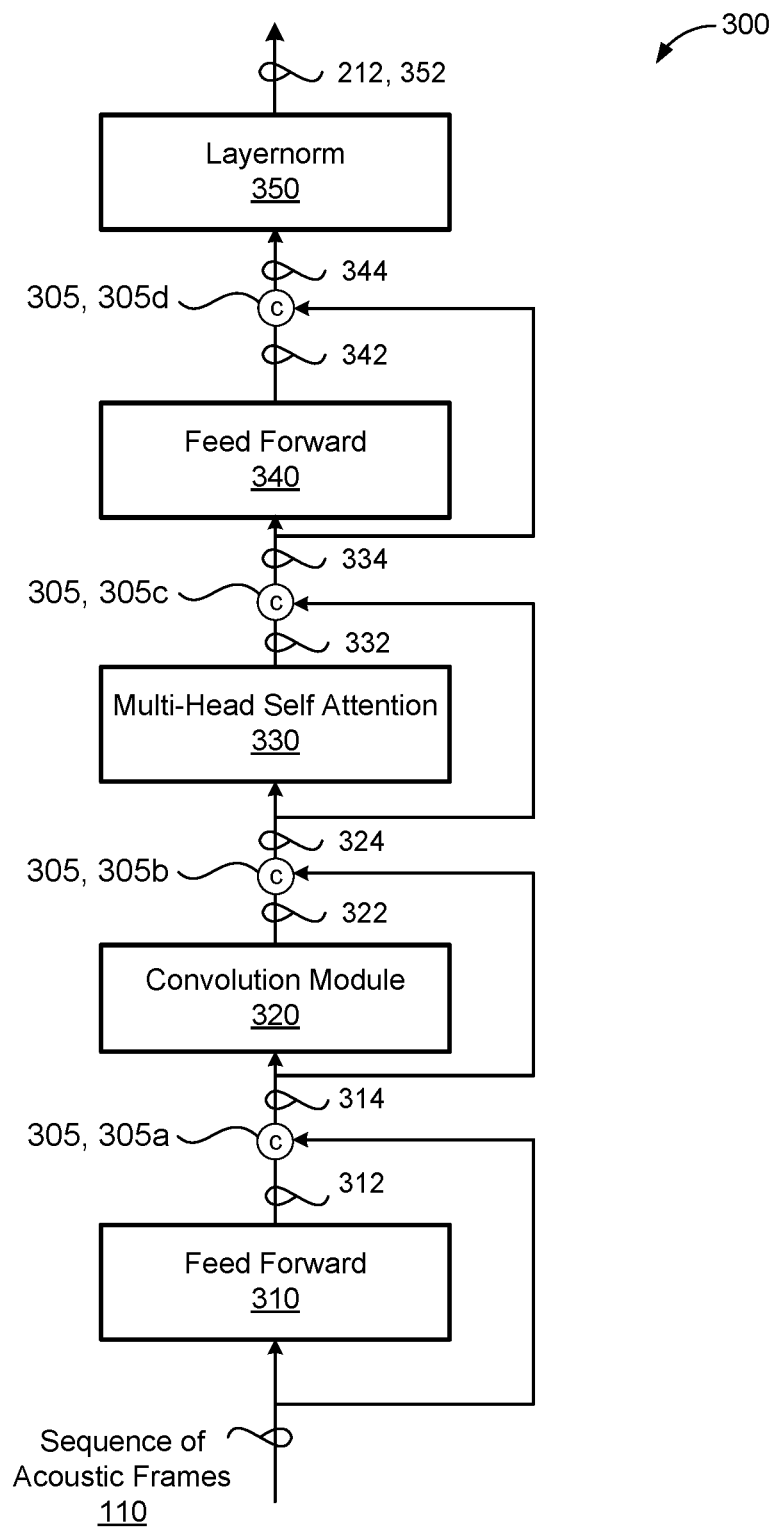
FIG. 3 is a schematic view of an example multi-head self-attention layer from a plurality of multi-head self-attention layers.

FIG. 3 illustrates an example multi-head self-attention layer 300 from the plurality of multi-head self-attention layers 300 of the encoder 210. The example mulita-head self-attention layer 300 (also referred to as simply "layer 300") includes a first half feed-forward module 310, a second half feed-forward module 340, with a convolution module 320 and a multi-head self-attention module 330 disposed between the first and second half feed-forward module 310, 340, a layernorm module 350, and concatenation operators 305, 305a-d. The first half feed-forward module 310 processes each acoustic frame 110 in the sequence of acoustic frames 110 corresponding to an utterance and generates an output 312. Next, a first concatenation operator 305a concatenates the output 312 with a corresponding acoustic frame 110 to generate a first concatenated input 314. Subsequently, the convolution module 320 subsamples the first concatenated input 314 including the output 312 of the first half feed-forward module 310 and the corresponding acoustic frame 110, and generates a convolutional output 322.

Next, a second concatenation operator 305b concatenates the convolutional output 322 with the first concatenated input 314 to generate a second concatenated input 324. Subsequently, the multi-head self-attention module 330 receives the second concatenated input 324 and generates a self-attention output 332. Thereafter, a third concatenation operator 305c concatenates the self-attention output 332 with the second concatenated input 324 to generate a third concatenated input 334. The third concatenated input 334 is provided, as input, to the second half feed-forward module 340, which generates an output 342. The output 342 of the second half feed-forward module 340 is concatenated with the third concatenated input 334 by a fourth concatenation operator 305d to generate a fourth concatenated input 344. Finally, the layernorm module 350 processes the fourth concatenated input 344 from the second half feed-forward module 340. Mathematically, the example mulita-head self-attention layer 300 transforms input features x (e.g., sequence of acoustic frames 110), using modulation features m, to produce output features y, as follows:

$$\hat{x} = x + r(m) \odot x + h(m) \quad (1)$$

$$\tilde{x} = \hat{x} + \frac{1}{2}FFN(\hat{x}), \tilde{n} = n + \frac{1}{2}FFN(n)$$

$$x' = \tilde{x} + Conv(\tilde{x}), n' = \tilde{n} + Conv(\tilde{n})$$

$$x'' = x' + MHCA(x', n')$$

$$x''' = x'' \odot r(x'') + h(x'')$$

$$x'''' = x' + MHCA(x', x''')$$

$$y = LayerNorm\left(x'''' + \frac{1}{2}FFN(x'''')\right).$$

The example multi-head self-attention layer 300 generates, at each of the plurality of output steps, a layer output 302 which is passed on to the next layer in the plurality of multi-head self-attention layers 300. A final layer 300 in the plurality layers 300 generates a higher-order feature representation 212 for a corresponding acoustic frame 110 in the sequence of acoustic frames 110 using the previous layer output 302. Thus, each layer 300 prior to the final multi-head self-attention layer 300 generates the layer output 302 which is passed on to the next layer, and the final multi-head self-attention layer 300 generates the higher-order feature representation 212.

Referring back to FIG. 2, the prediction network 220 may have two 2,048-dimensional LSTM layers, each of which is also followed by a 640-dimensional projection layer. Alternatively, the prediction network may include a plurality of multi-head self-attention layers (e.g., plurality of transformer or conformer layers), or an embedding look-up table in lieu of LSTM layers. Finally, the joint network may also have 640 hidden units. The Softmax layer 240 may be composed of a unified word piece or grapheme set that is generated using all unique word pieces or graphemes in a plurality of training data sets.

Figure 4:
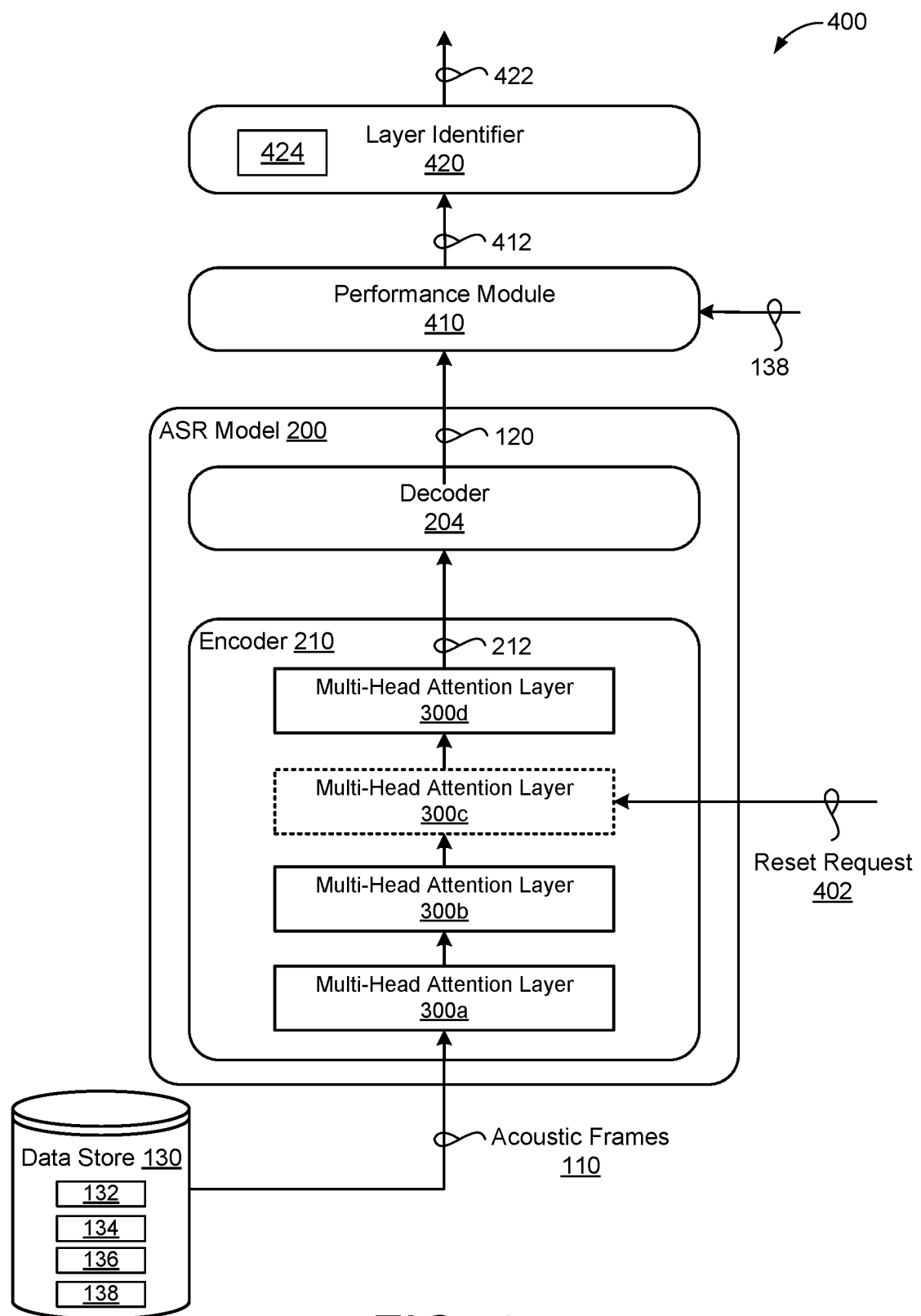
FIG. 4 is a schematic view of a layer identification process of identifying a layer classification for each multi-head self-attention layer.

FIG. 4 illustrates a layer identification (ID) process 400 configured to identify (i.e., classify) a layer classification 422 for each layer 300 in the plurality of layers 300 of the encoder 210. As shown in FIG. 4, the encoder 210 of the ASR model 200 includes four (4) layers 300 in the plurality of layers 300, 300a-d. The use of four (4) layers 300 is exemplary, as it is understood by those skilled in the art that the plurality of layers 300 may include any number of layers 300. The layer ID process 400 may execute on the remote computing device 60 (FIG. 1).

The layer classification 422 may include an ambient layer classification or a critical layer classification. As used herein, an ambient layer refers to a layer 300 that has a relatively small negative impact (e.g., less than a one (1) WER drop) on the performance of the trained ASR model 200 when the layer ID process 400 (or any other external factors) tampers with parameters of the ambient layer. Stated differently, ambient layers include a robustness characteristic such that when layer ID process 400 tampers with parameters of the ambient layer, the performance of the trained ASR model 200 remains relatively unchanged. As will become apparent, tampering with parameters may include re-initializing or re-randomizing the parameters of the layer 300. On the other hand, a critical layer refers to a layer 300 that has a significant negative impact (e.g., more than a one (1) WER drop) on the performance of the trained ASR model 200 when layer ID process 400 tampers with parameters of the critical layer. Put another way, critical layers include a sensitivity characteristic such that when the layer ID process 400 tampers with the parameters of the critical layer, the performance of the trained ASR model 200 is significantly impacted in a negative manner.

Notably, the layer ID process 400 identifies the layer classification 242 for each layer using a trained ASR model 200 (as opposed to an untrained ASR model). Accordingly, before identifying the layer classification 242 for each layer 300, the layer ID process 400 may obtain, from a data store 130, a multi-domain (MD) dataset 132 and train the ASR model 200 using the MD dataset 132 resulting in the trained ASR model 200. The MD dataset 132 includes training utterances from multiple domains including voice search, farfield, telephony, and video. Each training utterance in the MD dataset 132 also includes a corresponding label 138. In some examples, the layer ID process 400 trains the ASR model 200 using the MD dataset with short-form data withheld (MD-SF) dataset 134. The MD-SF dataset 134 includes all training utterances from the MD dataset 132 having an utterance duration that satisfies a duration threshold. For example, the MD-SF dataset 134 may include all training having an utterance duration exceeding 4.6 seconds. Moreover, a withheld domain (SF) dataset 136 includes all training utterances from the MD dataset 132 having an utterance duration that fails to satisfy the duration threshold (e.g., 4.6 seconds.). Simply put, the withheld domain (SF) dataset 136 may include all training utterances having utterance durations less than or equal to 4.6 seconds which may correspond to utterances indicative of short-form queries directed toward an digital assistant. As a result of training the ASR model 200, each layer 300 of the trained ASR model 200 includes trained parameters.

In some implementations, the layer ID process 400 trains the ASR model 200 using group normalization. In particular, during training, the layer ID process 400 performs group normalization by dividing channels of the sequence of acoustic frames 110 into groups and determining, for each group, a corresponding mean and variance for normalization. That is, group normalization normalizes the features for each divided group. Group normalization does not exploit batch dimensions and is independent of batch sizes unlike batch normalization.

After training the ASR model 200, the layer ID process 400 resets each respective layer 300 in the trained ASR model 200 one layer at a time, and then determines the resulting performance of the trained ASR model 200 with the respective one layer 300 reset. In some implementations, the layer ID process 400 resets each layer 300 at a layer-level. That is, the layer ID process 400 resets the entire layer 300 (e.g., all modules) rather than resetting individual modules within the layer 300. In other implementations, the layer ID process 400 resets each layer 300 at a module-level. That is, the layer ID process 400 may reset one or more modules (e.g., first and second half feed-forward module 310 340, convolution module 320, multi-head self-attention module 330, and layernorm module 350 (FIG. 3)) at a time within each layer 300 without resetting any of the other modules in the layer 300.

In some examples, the layer ID process 400 resets each respective layer 300 in the trained ASR model 200 one at a time by re-initializing the plurality of parameters (e.g., trained parameters) of the respective layer 300 of the trained ASR model 200 to initial values of the respective layer 300. That is, the plurality of parameters are reset to initial values that the respective layer 300 had before the layer ID process 400 trained the parameters of each respective layer 300 of the ASR model 200. In other examples, the layer ID process 400 resets each respective layer 300 in the trained ASR model 200 one at a time by re-randomizing the plurality of parameters of the respective layer 300 of the ASR model 200 by setting the plurality of parameters of the respective layer 300 to random values sampled from a sample distribution that original values were sampled from. Notably, resetting each respective layer 300 in the ASR model 200 one at a time includes resetting each respective layer 300 in the trained neural network model one at a time without resetting any of the other layers in the trained ASR model 200.

After resetting each respective layer 300 in the trained ASR model 200 one at a time, the layer ID process 400 determines a corresponding word error rate (WER) 412 of the trained ASR model 200 associated with the respective reset layer 300. Simply put, the layer ID process 400 resets a single respective layer 300 and then determines the corresponding WER 412 of the trained ASR model 200 with the single respective layer 300 reset and without any of the other layers 300 in the trained ASR model 200 being reset. For example, as shown in FIG. 4, the layer ID process 400 sends a reset request 402 to the third self-attention layer 300c that resets the third self-attention layer 300c (denoted by the dashed lines) without resetting any of the other layers 300a,b,d in the trained ASR model 200 (denoted by the solid lines). Here, the layer ID process 400 may reset the third self-attention layer 300c by either re-initializing or re-randomizing the plurality of parameters of the third self-attention layer 300c.

Continuing with the above example, after resetting the third self-attention layer 300c, the layer ID process 400 determines a corresponding WER 412 of the trained ASR model 200 associated with the reset third self-attention layer 300c. That is, in determining the corresponding WER 412 associated with the reset third self-attention layer 300c, the parameters of the third self-attention layer 300c remain reset while the other layers 300a,b,d are not reset. To determine the WER 412, the encoder 210 of the ASR model 200 receives a sequence of acoustic frames 110 corresponding to an utterance from the data store 130 having a corresponding label 138 representing an accurate transcription. Thereafter, each layer 300 of the encoder 210 generates a layer output 302 (FIG. 3), and the final layer 300 (e.g., fourth layer 400d in FIG. 4) in the plurality of layers 300 generates a higher-order feature representation 212 for the corresponding acoustic frame 110 in the sequence of acoustic frames 110.

The decoder 204 of the ASR model 200 may be a RNN-T model that includes the prediction network 220, joint network 230, and Softmax layer 240 (FIG. 2). Thus, the decoder 204 receives, as input, the higher-order feature representation 212 and outputs the transcription 120 for a corresponding higher-order feature representation 212. A performance module 410 receives the transcription 120 generated by the trained ASR model 200 and a corresponding label 138, and determines a corresponding WER 412 of the trained ASR model 200 associated with the respective layer 300 that has been reset by comparing the transcription 120 with the corresponding label 138. The layer ID process 400 may determine the WER 412 by comparing the transcription 120 and corresponding label 138 for a predetermined number of utterances from the data store 130. For example, the layer ID process may determine the WER 412 of the trained ASR model 200 when the third layer 300c is reset by determining how many accurate transcriptions 120 the encoder 200 predicts from 100 utterances.

The layer identifier 420 is configured to identify a layer classification 422 for each layer 300 in the plurality of layers 300 as either ambient or critical. In particular, the layer identifier 420 receives the corresponding WER 412 and determines whether each the layer 300 is ambient or critical based on a WER threshold. For instance, the layer identifier 420 identifies a respective layer 300 as ambient when the respective layer 300 has a corresponding WER 412 that satisfies the WER threshold. In other instances, the layer identifier 420 identifies a respective layer 300 as critical when the respective layer 300 has a corresponding WER 412 that fails to satisfy the WER threshold. The WER threshold may configured to any number by the client of the client device.

In some implementations, the layer ID process 400 identifies each respective layer as corresponding to an ambient layer or critical layer based on a churn metric 424 in addition to, or in lieu of, the WER rate 412. More specifically, the layer ID process 400 determines the churn metric 424 by the difference between parameter values of a respective layer 300 at initialization (e.g., checkpoint-0 or before training the ASR model 200) and parameter values of the respective layer 300 at regular intervals (e.g., checkpoints) during training. Thus, the layer ID process 400 determines parameter values of each respective layer 300 on a per-module basis to determine the churn metric 424 by:

$$\frac{\left|W^{m,l}(t) - W^{m,l}(0)\right|_F}{\max_{l'}\left|W^{m,l'}(t) - W^{m,l'}(0)\right|_F} \qquad (2)$$

In Equation 2, t represents a training step (e.g., checkpoint step), l represents the layer 300, m represents the module within the layer. Thus, the layer ID process 400 may identify each respective layer 300 as either critical or ambient using based determining the churn metric 424 during training the ASR model 200.

FIG. 4 illustrates the layer ID process 400 identifying the layer classification 422 only for the third layer 300c for the sake of brevity. Thus, it is understood by those skilled in the art that the layer ID process 400 identifies the layer classification 422 for each layer 300 in the plurality of layers 300 by resetting each respective layer 300 one at a time, and then identifying the respective layer 300 as corresponding to an ambient layer or a critical layer based on the corresponding WER 412 of the ASR model 200.

Figure 5:
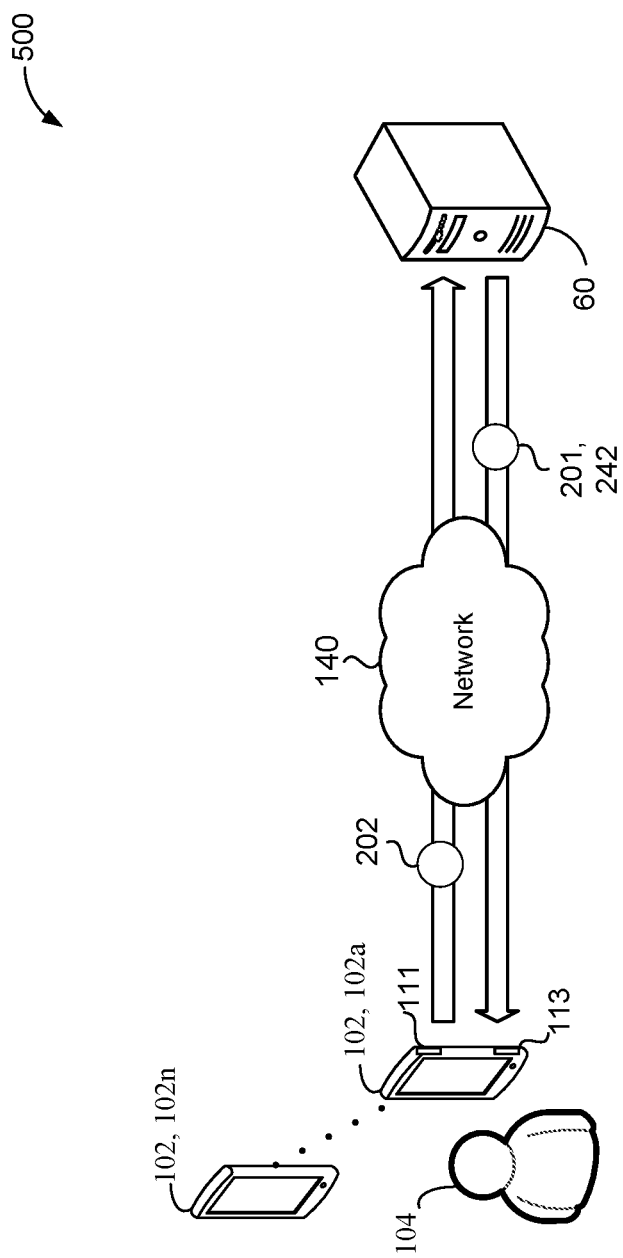
FIG. 5 is a schematic view of a Federated Learning process of transmitting an on-device speech recognition model to execute on one or more client devices.

Referring now to FIG. 5, after the layer ID process 400 identifies the layer classification 422 for each layer 300 in the plurality of layers 300 as either ambient or critical, a Federated Learning (FL) process 500 transmits an on-device neural network model (e.g., on-device ASR model) 201 to execute on one or more user/client/edge devices 102, 102a-n. Each client device 102 may be associated with a respective user/client 104 and is in communication with the remote computing device 60 via a network 140. The on-device ASR model 201 may be the same ASR model 200 trained by the layer ID process 400 (FIG. 4) or a different ASR model (e.g., pre-trained model) having a substantially similar plurality of layers 300. Thus, the layers 300 identified as ambient or critical for the trained ASR model 200 will similarly be ambient or critical for the on-device ASR model 201. Moreover, the FL process 500 transmits the layer classification 242 associated with each layer 300 in the plurality of layers 300 of the on-device ASR model 201 to the client device 102.

The client device 102 may need to re-train, update, or perform training on the on-device ASR model 201 for any number of reasons after receiving the on-device ASR model 201 from the remote computing device 60. Advantageously, the client device 102 may train or re-train the on-device ASR model 201 by applying Federated Dropout more heavily on any layers 300 of the plurality of layers 300 of the trained ASR model 200 identified as corresponding ambient layers to reduce the number of parameters of the on-device ASR model 201. Federated Dropout refers to locally (e.g., at the client device 102) training the on-device ASR model 201 with less parameters than training the ASR model 200 at the remote computing device 60. As a result, the FL process 500 may train the on-device ASR model 201 more efficiently at the client device 102 using the limited resources of the data processing hardware 111 and memory hardware 113 without sacrificing WER performance.

Notably, Federated Dropout may train all layers 300 in the plurality of layers 300 with less parameters than the layer ID process 400 trains the ASR model 200 with at the remote computing device 60, but the Federated Dropout applied to ambient layers may be greater. For example, a layer 300 identified as critical may be trained at the client device 102 with 5% less parameters while a layer 300 identified as ambient may be trained at the client device with 10% less parameters. In some implementations, the FL process 500 trains the on-device ASR model 201 at the client device 102 using the SF dataset 136. That is, while the ASR model 200 may train at the remote computing device 60 using the MD-SF dataset 134, the on-device ASR model 201 may train at the client device using the SF dataset 136.

Moreover, each client device 102 of the one or more client devices 102 generates a gradient (e.g., loss) 202 by training/generating the on-device ASR model 201 at the client device and transmits the gradient to the remote computing device 60 via the network 140. The gradients 202 received from each of the client device 102 may be used to further train the ASR model 200 at the remote computing device 60.

Figure 6:
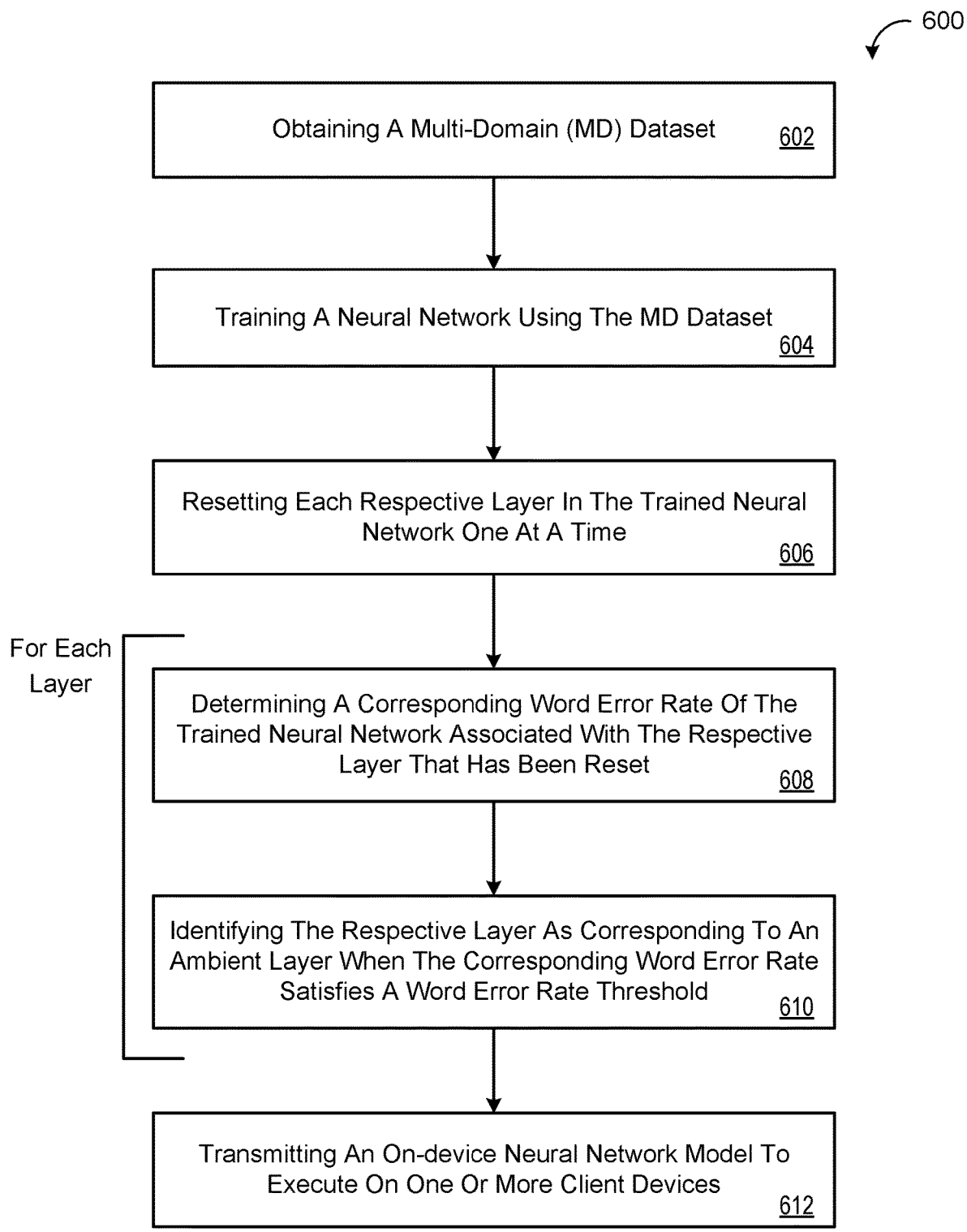
FIG. 6 is a flowchart of an example arrangement of operations for a computer-implemented method of exploring heterogeneous characteristics of layers in ASR models for more efficient training.
Figure 7:
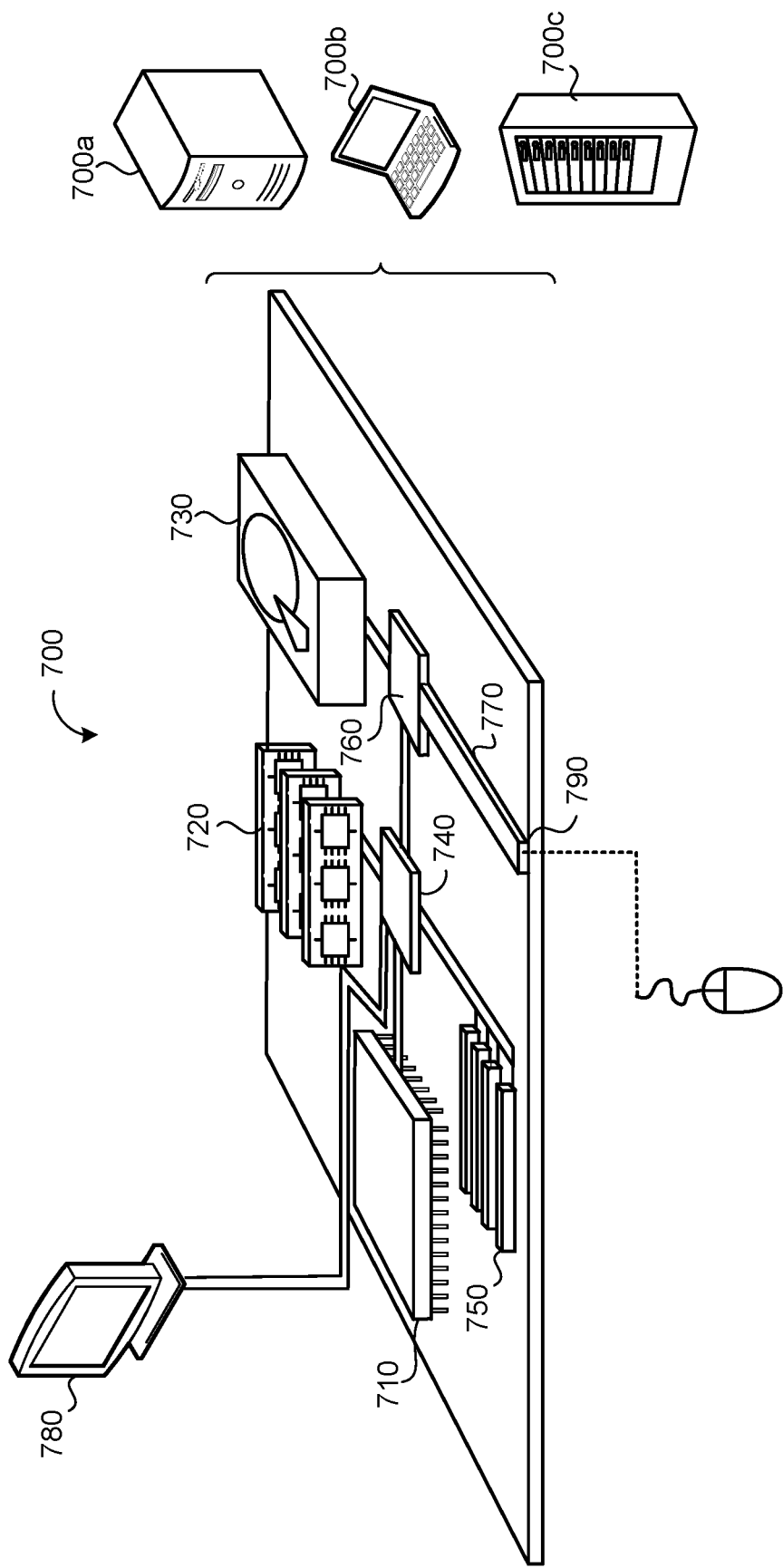
FIG. 7 is a schematic view of an example computing device that may be used to implement the systems and methods described herein.

FIG. 6 is a flowchart of an example arrangement of operations for a computer-implemented method 600 of exploring heterogeneous characteristics of layers in ASR models for more efficient training. The method 600 may execute on data processing hardware 710 (FIG. 7) using instructions stored on memory hardware 720 (FIG. 7). The data processing hardware 710 and the memory hardware 720 may reside on the remote computing device 60 of FIG. 1 corresponding to a computing device 700 (FIG. 7).

At operation 602, the method 600 includes obtaining a multi-domain (MD) dataset 132. At operation 604, the method 600 includes training a neural network model (e.g., ASR model) 200 using the MD dataset with short-form data withheld (MD-SF) dataset 134. The ASR model 200 includes a plurality of layers 300 each having a plurality of parameters. At operation 606, the method 600 includes resetting each respective layer 300 in the trained ASR model 200 one at a time. For each respective layer 300 in the trained ASR model 200, and after resetting the respective layer 300, the method 600 performs operations 608 and 610. At operation 608, the method 600 includes determining a corresponding word error rate (WER) 412 of the trained ASR model 200 associated with the respective layer 300 that has been reset. At operation 610, the method 600 includes identifying the respective layer 300 as corresponding to an ambient layer when the corresponding WER 412 of the trained ASR model 200 associated with the respective layer 300 that has been reset satisfies a word error rate threshold.

At operation 612, the method 600 includes transmitting an on-device neural network model (on-device ASR model) 201 to execute on one or more client devices 102 for generating gradients 202 based on the withheld domain (SF) dataset 136 of the MD dataset 132. The one-device ASR model 201 model includes the plurality of layers 300 of the trained ASR model 200 and is generated by applying Federated Dropout more heavily on any layers 300 of the plurality of layers 300 of the trained ASR model 200 identified as corresponding to the ambient layer to reduce the number of parameters of the on-device ASR model 201.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    obtaining a multi-domain (MD) dataset;
    training a neural network model using the MD dataset with short-form data withheld (MD-SF), the neural network model comprising a plurality of layers each comprising a plurality of parameters and the short-form data withheld from the MD dataset comprising training utterances each having an utterance duration that fails to satisfy a duration threshold;
    resetting each respective layer in the trained neural network model one at a time;
    for each respective layer in the trained neural network model, after resetting the respective layer:
        determining a corresponding word error rate of the trained neural network model associated with the respective layer that has been reset; and
        identifying the respective layer as corresponding to an ambient layer when the corresponding word error rate of the trained neural network model associated with the respective layer that has been reset satisfies a word error rate threshold; and
    transmitting an on-device neural network model to execute on one or more client devices for generating gradients based on the short-form data (SF) withheld from the MD dataset, the on-device neural network model comprising the plurality of layers of the trained neural network model and generated by applying Federated Dropout to train all layers in the plurality of layers of the trained neural network model with a number of parameters of the on-device neural network model that is less than the plurality of parameters of the trained neural network model, the applied Federated Dropout training any layers of the plurality of layers of the trained neural network model identified as corresponding to the ambient layer with less parameters than those layers of the plurality of layers of the trained neural network model not identified as corresponding to the ambient layer to reduce the number of parameters of the on-device neural network model.

2. The computer-implemented method of claim 1, wherein resetting each respective layer in the trained neural network model one at a time comprises re-initializing the plurality of parameters of the respective layer of the neural network model to initial values of the respective layer.

3. The computer-implemented method of claim 1, wherein resetting each respective layer in the trained neural network model one at a time comprises re-randomizing the plurality of parameters of the respective layer of the neural network model by setting the plurality of parameters of the respective layer to random values sampled from a sample distribution that original initial values were sampled from.

4. The computer-implemented method of claim 1, wherein resetting each respective layer in the trained neural network model one at a time comprises resetting each respective layer in the trained neural network model one at a time without resetting any of the other layers in the trained neural network model.

5. The computer-implemented method of claim 1, wherein the plurality of layers of the neural network model comprise multi-head self-attention layers.

6. The computer-implemented method of claim 5, wherein the multi-head self-attention layers comprise conformer layers.

7. The computer-implemented method of claim 5, wherein the multi-head self-attention layers comprise transformer layers.

8. The computer-implemented method of claim 1, wherein the neural network model comprises a speech recognition model.

9. The computer-implemented method of claim 1, wherein the operations further comprise, for each respective layer in the trained neural network model, after resetting the respective layer, identifying the respective layer as corresponding to a critical layer when the corresponding word error rate of the trained neural network model associated with the respective layer that has been reset fails to satisfy the word error rate threshold.

10. The computer-implemented method of claim 1, wherein training the neural network model comprises training the neural network model using group normalization.

11. A system comprising:
    data processing hardware; and
    memory hardware in communication with the data processing hardware, the memory hardware storing instructions that when executed on the data processing hardware cause the data processing hardware to perform operations comprising:
        obtaining a multi-domain (MD) dataset;
        training a neural network model using the MD dataset with short-form data withheld (MD-SF), the neural network model comprising a plurality of layers each comprising a plurality of parameters and the short-form data withheld from the MD dataset comprising training utterances each having an utterance duration that fails to satisfy a duration threshold;
        resetting each respective layer in the trained neural network model one at a time;
        for each respective layer in the trained neural network model, after resetting the respective layer:
            determining a corresponding word error rate of the trained neural network model associated with the respective layer that has been reset; and
            identifying the respective layer as corresponding to an ambient layer when the corresponding word error rate of the trained neural network model associated with the respective layer that has been reset satisfies a word error rate threshold; and
        transmitting an on-device neural network model to execute on one or more client devices for generating gradients based on the short-form data (SF) withheld from the MD dataset, the on-device neural network model comprising the plurality of layers of the trained neural network model and generated by applying Federated Dropout to train all layers in the plurality of layers of the trained neural network model with a number of parameters of the on-device neural network model that is less than the plurality of parameters of the trained neural network model, the applied Federated Dropout training any layers of the plurality of layers of the trained neural network model identified as corresponding to the ambient layer with less parameters than those layers of the plurality of layers of the trained neural network model not identified as corresponding to the ambient layer to reduce the number of parameters of the on-device neural network model.

12. The system of claim 11, wherein resetting each respective layer in the trained neural network model one at a time comprises re-initializing the plurality of parameters of the respective layer of the neural network model to initial values of the respective layer.

13. The system of claim 11, wherein resetting each respective layer in the trained neural network model one at a time comprises re-randomizing the plurality of parameters of the respective layer of the neural network model by setting the plurality of parameters of the respective layer to random values sampled from a sample distribution that original initial values were sampled from.

14. The system of claim 11, wherein resetting each respective layer in the trained neural network model one at a time comprises resetting each respective layer in the trained neural network model one at a time without resetting any of the other layers in the trained neural network model.

15. The system of claim 11, wherein the plurality of layers of the neural network model comprise multi-head self-attention layers.

16. The system of claim 15, wherein the multi-head self-attention layers comprise conformer layers.

17. The system of claim 15, wherein the multi-head self-attention layers comprise transformer layers.

18. The system of claim 11, wherein the neural network model comprises a speech recognition model.

19. The system of claim 11, wherein the operations further comprise, for each respective layer in the trained neural network model, after resetting the respective layer, identifying the respective layer as corresponding to a critical layer when the corresponding word error rate of the trained neural network model associated with the respective layer that has been reset fails to satisfy the word error rate threshold.

20. The system of claim 11, wherein training the neural network model comprises training the neural network model using group normalization.

* * * * *